235-417 SR
XR 3,033,462
CROSS REFERENCE
May 8, 1962 G. C. GUCKER ETAL 3,033,462
CORRECTING 3D CAM ERRORS
Filed April 7, 1960
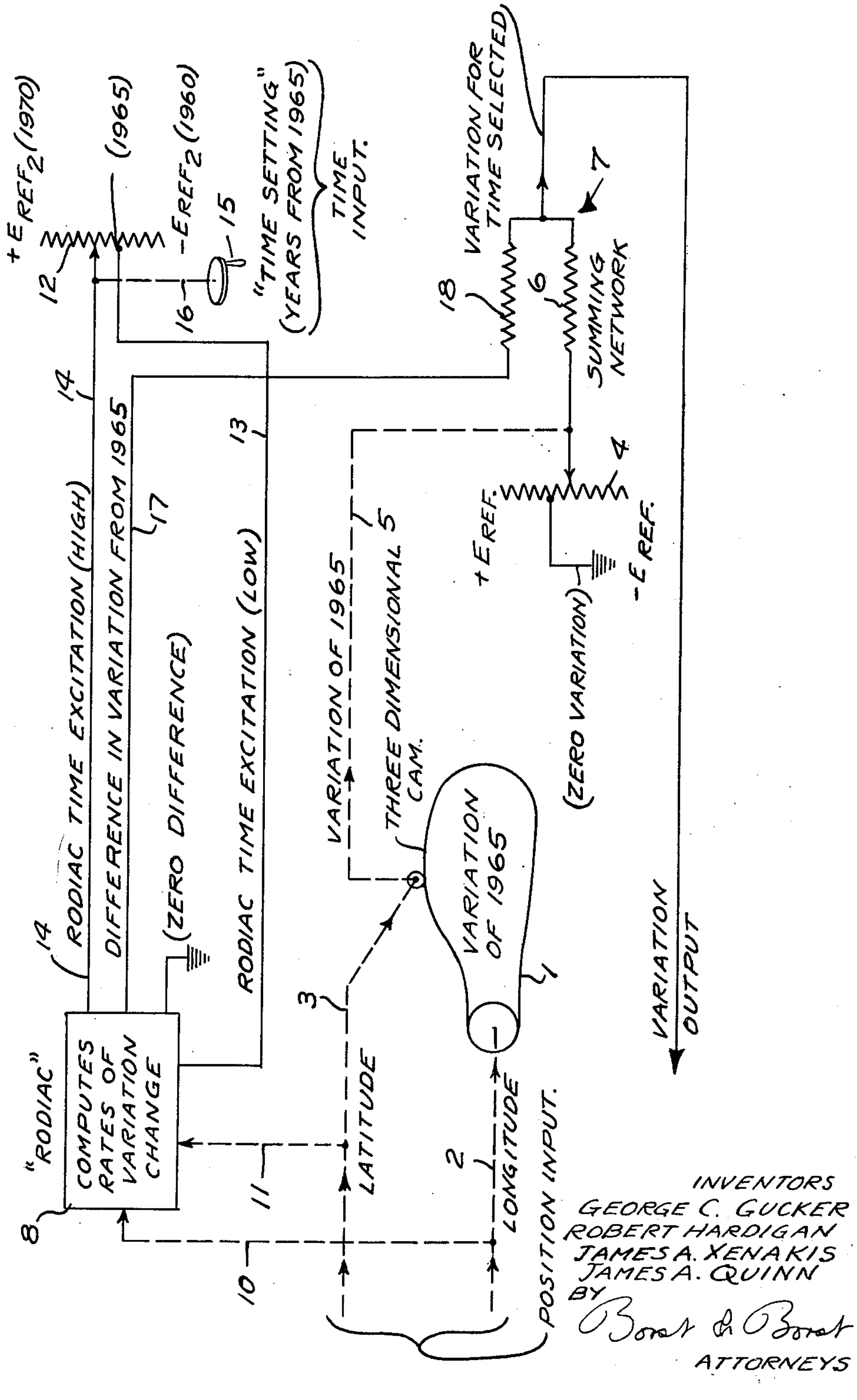
INVENTORS
GEORGE C. GUCKER
ROBERT HARDIGAN
JAMES A. XENAKIS
JAMES A. QUINN
BY Borst & Borst
ATTORNEYS
SEARCH ROOM 3,033,462
Patented May 8, 1962

3,033,462

CORRECTING 3D CAM ERRORS

George C. Gucker, Woodside, Robert Hardigan, Bronx, James A. Xenakis, Brooklyn, and James A. Quinn, North Massapequa, N.Y., assignors to Sperry Rand Corporation, Ford Instrument Company Division, Wilmington, Del., a corporation of Delaware Filed Apr. 7, 1960, Ser. No. 20,635
1 Claim. (Cl. 235—197)

This invention relates to computers and more particularly to computing systems having means for correcting repeatable error in the generated output of the principal calculating components.

The three-dimensional cam is employed in numerous computing applications as, for example, navigation and ballistic computers. One difficulty in their use for these purposes resides in the fact that the data to which the cams were cut change with time. It is easily appreciated, for example, that gun ballistics alter as the gun ages. Such difficulty necessitates replacement of the ballistic data cam or adopting some means for offsetting their inputs—a practice which is known as "skewing the cam." It is in accordance with this invention that a new solution is offered to this problem according to which a function error rate determining device is provided to combine its output with that of the cam which is cut to generate values for the function as of a particular time. Manually operated means are afforded for multiplying the rate by elapsed time so that this error can be determined for a desired date in the future.

One object of the invention is to provide a three-dimensional cam computing system having means for combining an error correction with the generated output of said cam for the purpose of correcting the output of the cam which has a known repeatable error due to input positioning, cam machining or errors in the data to which the cam is cut.

Another object of the invention is to provide a three-dimensional cam computing system in which there is provided a rate error computer with means for correcting the generated cam output with a time accumulated error.

Other objects and advantages of the invention may be appreciated on reading the following detailed description of one embodiment thereof which is taken in conjunction with the accompanying drawing affording the schematic illustration of one specific application of applicants' inventive concept.

Referring to the drawing, there is provided a three-dimensional cam 1 having an axial drive shaft 2 settable in accordance with longitude and a cam positioning shaft 3 set up in accordance with latitude. The cam is cut to generate a function for magnetic variation at a particular time and in accordance with the setting of the positioned input shafts 2 and 3. A potentiometer 4 whose slider is positioned by cam follower shaft 5 receives the mechanical generated output of the cam and translates this output to an electrical analog in its output. The potentiometer 4 is also center grounded with a positive and negative reference source connected to its respective sides so that positive and negative values for magnetic variation may be represented in its output. This output is fed to leg 6 of adding network 7 the output of which is an error corrected voltage representing a true value for magnetic variation.

The error correction for the cam is determined by a magnetic variation rate computer 8 which is also settable in accordance with the input shafts 10 and 11 connected, respectively, to the longitude and latitude shafts 2 and 3. The computer 8 is designed to supply an error voltage representing the error accumulated over the period of time elapsed since the date for which the function generating cam was cut. Rate of magnetic variation differs according to position on the earth's surface and, therefore, the computer is arranged to generate a rate function according to the same longitude and latitude at which the cam is set. The art will furnish examples of the type of computer which can be so designed. Applicants' system preferably provides a computer known as a "rodiac" which is presently manufactured by the Trio Laboratories, Inc. of Plainview, New York. The "rodiac" provides a rate of change of variation as a function of latitude and longitude as an attenuation of its excitation voltage. An attenuation of less than one-half is a decreasing rate while one-half is a zero difference change which is available for the time the cam is cut and more than one-half is an increasing rate. Generally, the "rodiac" as a magnetic variation error supplier for the magnetic variation cam 1 requires a decreasing rate of error for the period of time prior to the date at which the cam is cut, a zero difference rate of error at that date and an increasing rate after the date. The period of time during which the cam output can be corrected by the "rodiac" is established by a center tapped linear potentiometer 12 which can be manually positioned at the time for which variation is desired. The potentiometer 12 is referenced by a positive and negative reference source representing the beginning and end of time period. For example, if the magnetic cam is cut for the generation of magnetic variation as of June 1965, the potentiometer 12 can be set by the reference source to adjust the "rodiac" so that the latter is enabled to compute rate of magnetic variation change for the decade 1960–1970. A zero difference voltage is provided the potentiometer 12 and the "rodiac" 8 by the center tapped connection 13 which thereby affords zero referencing for the two components. Excitation voltage is provided the "rodiac" on the lead 14 by the potentiometer 12 whose wiper is connected to the lead 14 and is positioned by the time setting dial 15 and dial shaft 16. Thus, prior to June 1965 a negative voltage relative to the center tap whose magnitude represents the time until June 1965 is provided by the wiper to excite the "rodiac." At June 1965, zero excitation is provided by the center tap lead 13 and after June 1965 a positive excitation relative to the second tap whose magnitude represents the time elapsed since June 1965 is provided. The "rodiac" output voltage therefor represents the rate of variation data change multipled by a voltage representing the period of time relative to June 1965. This voltage appears in the output connection 17 which is connected to the leg 18 of the summing network 7. Hence the total variation is made available by the "rodiac." Adding this error variation data of the "rodiac" to the voltage representing the variation for June 1965 provided by the cam driven potentiometer 4, the summing network provides an output voltage representing true variation for the desired time setting and the longitude and latitude inputs.

It must be understood that the magnetic variation computing system described above is merely illustrative of one embodiment of applicants' invention. Other applications of the inventive concept may be easily effected according to the function to be generated by the error correcting cam and the corresponding function representing error rate of change in the cam output. The error supplied this output need not necessarily, for example, be made a function of time. Accordingly, the scope and principal of the invention is to be defined and limited solely in accordance with the claim hereinafter appended.

What is claimed is:

A three-dimentional cam correcting system comprising a three-dimensional cam having a known repeatable error, said cam being rotatable on a given axis and having a cam follower, a first shaft connected to rotate said cam on its given axis, a second shaft connected to position said follower axially on the surface of the cam, a computer for electrically determining the rate of said repeatable error in said cam, said first and second shafts being also connected to the input side of said computer, a first potentiometer having a wiper, said first potentiometer being connected to supply a third input to said computer, mechanical means for adjusting the wiper on said first potentiometer in accordance with time, a summing network, one side of the summing network being connected to the output side of the computer, a second potentiometer driven according to the mechanical output of said three-dimensional cam, another side of said summing network being connected to the output of said second potentiometer, whereby the output of said second potentiometer is an analog representing the output of said three-dimensional cam corrected for its repeatable error.

References Cited in the file of this patent

UNITED STATES PATENTS

| | | |
|---|---|---|
| 2,872,106 | Steele | Feb. 3, 1959 |
| 2,996,244 | Kissin | Aug. 15, 1961 |